United States Patent Office 3,306,833
Patented Feb. 28, 1967

3,306,833
METHOD OF MAKING A PHOTOTROPIC GLASS ARTICLE
Thomas G. O'Leary, Corning, N.Y., assignor to Corning Glass Works, Corning, N.Y., a corporation of New York
No Drawing. Filed Mar. 8, 1963, Ser. No. 263,747
8 Claims. (Cl. 204—157.1)

This invention relates to the manufacture of articles from glass compositions which exhibit phototropic properties, i.e., their optical transmittance varies reversibly with the intensity of the actinic radiation incident thereon.

The co-pending United States patent application, Serial No. 213,634, filed July 31, 1962, now U.S. Patent No. 3,208,860, by W. H. Armistead and S. D. Stookey, sets forth the theoretical consideration involved in the production of phototropic glass articles and describes, in detail, a method of making such. As explained therein, a phototropic glass possesses the inherent characteristic that its optical transmittance varies reversibly with the intensity of actinic radiation incident thereon. As is further enlarged upon therein, the primary feature which sets this glass apart from the well-known photosensitive glasses, i.e., glasses which can be darkened by means of exposure to ultraviolet radiation followed by heat treatment thereof, exists in the reversibility of its optical transmittance as it is alternately exposed to and then removed from actinic radiation.

Armistead and Stookey disclose inorganic silicate glasses that can be made phototropic through the dispersal of radiation-sensitive crystals therein. These crystals become darker in color upon exposure to actinic radiation but regain their original color when the activating radiation is removed. The explanation for this effect is still not positively known and the theory developed by Armistead and Stookey, viz, that there is some sort of a reaction involved between the actinic radiation and the submicroscopic crystals dispersed in the glassy matrix which alters the absorptive characteristics of the crystals upon visible radiation, has been accepted as the most reasonable conclusion. The reversibility of optical transmittance is laid to the fact that, as these radiation-sensitive crystals are dispersed in an amorphous or glassy matrix, the exclusion of the actinic radiation enables the crystals to return to their original state, since this matrix is impermeable and non-reactive to the products formed upon such exposure and, hence, they cannot diffuse away. Glass exhibiting phototropic properties has been recommended for use in windows, automobile windshields, ophthalmic lenses, structural wall panels, and the like.

Armistead and Stookey disclosed a fairly broad range of operable compositions of base glass in the system $R_2O \cdot B_2O_3 \cdot Al_2O_3 \cdot SiO_2$, where $R_2O$ represents the alkali metal oxides, $Li_2O$, $Na_2O$, $K_2O$, $Rb_2O$, and $Cs_2O$. These glasses could be made phototropic through the addition of silver and a halogen selected from the group chlorine, bromine, and iodine, or mixtures thereof. Thus, the base glass consists essentially, by weight, of about 40–76% $SiO_2$, 4–26% $Al_2O_3$, 4–26% $B_2O_3$, and at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$. To this base glass composition is added at least one halogen in the indicated minimum effective proportion of 0.2% chlorine, 0.1% bromine, and 0.08% iodine and a minimum of silver in the indicated proportions of 0.2% in a glass wherein the effective halogen is chlorine, 0.05% in a glass containing at least 0.1% bromine but containing less than 0.08% iodine, and 0.03% in a glass containing at least 0.08% iodine. The total of the base glass constituents, the silver, and the halogen is stated as comprising at least 85% of the final glass composition. These same inventors further disclosed the addition of very minor amounts of low-temperature reducing agents such as tin oxide, iron oxide, copper oxide, arsenic oxide, and antimony oxide to improve the phototropic characteristics of the glass and also the possible additions of fluorine, $P_2O_5$, and certain bivalent metal oxides such as MgO, CaO, BaO, SrO, ZnO, and PbO.

In this same application, Armistead and Stookey described a general means for manufacturing bodies of phototropic glass, viz, the batch ingredients are melted, shaped and cooled through conventional glassworking techniques such as blowing, casting, drawing, pressing, rolling, and the like, into the desired article, and the essential crystallization of the radiation-sensitive silver halide crystals obtained during the forming and cooling process or by a subsequent heat treatment.

In the practice of the teachings of Armistead and Stookey, it was learned that the degree or quality of phototropicity exhibited by the products of their invention was dependent, in the main, upon two factors: (1) composition of the glass and (2) the use of the proper heat treatment. Thus, it was discovered that glasses of certain compositions would display excellent phototropic characteristics when a specific heat treatment was utilized and poor characteristics when a different heat treatment was employed. Also, some compositions demonstrated but poor phototropicity notwithstanding any heat treatment.

Therefore, the principal object of this invention is to provide a method of enhancing the phototropic properties of glass bodies.

Other objects of this invention will become apparent from the description set forth hereinbelow.

I have discovered that the phototropicity of glasses can be improved by subjecting the glass bodies to an exposure of X-rays or gamma rays before or during the customary heat treating step. Thus, in its broadest terms, my invention consists of compounding a glass-forming batch of a potentially phototropic glass composition, melting said batch, and then cooling and shaping the melt to a glass body of the desired configuration, following any of the conventional glass-forming techniques such as blowing, casting, drawing, pressing, rolling, spinning, etc. The glass body is then exposed to X-rays or gamma rays during which or after which the glass article is subjected to a temperature and for a time normally required to develop phototropicity in the glass. Finally, the article is cooled to room temperature. I have determined that this invention can be utilized with particular advantage with glasses within the compositional limits of Armistead-Stookey, noted hereinabove, but which do not display the desired phototropicity, i.e., the glasses do not darken sufficiently for the required purpose when exposed to actinic radiation. This exposure appears to have a beneficial effect even upon those glasses which exhibit very satisfactory phototropic properties merely upon heat treatment. Thus, the effect produced has been termed a more homogeneous phototropic character. The mechanism involved in the exposure to X-rays or gamma rays is not understood but it has been postulated that the irradiation probably produces a nucleation site upon which crystallization takes place during the subsequent heat treatment. This hypothesis concerning nucleation is strengthened by the fact that exposing the glass body to X-rays or gamma rays concurrently with the heat treating step also improves the phototropic properties of the final product but does not yield as homogeneous a character as is the case where the irradiation precedes the heat treating step. Therefore, my preferred practice requires exposure to X-rays or gamma rays prior to heat treatment.

The following examples are set out below by way of illustrating the invention and not as limiting the scope of the invention. Each example has an analyzed composition included within the ranges set forth in the Armistead-Stookey application, the preferred glasses for this invention. In each instance, the batch ingredients were compounded, ball-milled together to yield a more homogeneous melt, and then melted for about 8 hours at about 1500° C. in a glass tank in accordance with conventional melting practice. It will be appreciated that where smaller amounts of product are desired the batch may be melted in crucibles or pots. The melts were then shaped into the desired article, utilizing conventional glass-forming methods, and thereafter cooled to room temperature. This cooling process frequently is supplemented with an annealing step. The glass articles are preferably cooled to room temperature prior to heat treatment to permit inspection of the ware and to initiate the irradiation treatment, as irradiation by X-rays or gamma rays prior to heat treatment yields a somewhat better product. Nonetheless, where fuel economies and greater speed of operation are factors of great importance, the glass articles may only be cooled to at least below the transformation point, i.e., the temperature at which the liquid melt is deemed to have been transformed into an amorphous solid, generally in the vicinity of the annealing point of the glass, the articles exposed to irradiation and heat treated simultaneously, and then cooled to room temperature. In general, this heat treatment consists of exposing the glass article to a temperature of about 400° C., but not above about 1000° C., for a time sufficient to attain the desired internal crystallization such that the article will exhibit phototropic properties. Normally, and preferably, the glass article should be exposed to a temperature above the strain point of the glass. However, crystallization has been developed at 400° C. although the strain points of some of these glasses are as much as 50°–100° C. higher than this. The time of heat treatment is directly dependent upon the temperature employed, ranging from about 1–5 minutes at 1000° C. to 24 hours and even longer at 400° C. It is reasoned that this heat treatment acts to permit the rearrangement of anions and cations to thereby form a separate submicroscopic crystalline phase of the desired radiation-sensitive material within the glassy matrix. This rearrangement progresses more rapidly at higher temperatures mainly because the viscosity of the glassy matrix decreases as the temperature is raised, thereby decreasing the resistance to the movement required in pursuing the rearrangement. This makes it apparent, then, that a much briefer heating period at the higher extreme of the temperature range will result in comparable rearrangement as a long period at the lower extreme of the heating range. Nevertheless, as there are other reactions which can possibly occur during the heat treating step, such as agglomeration and precipitation of other crystalline phases, heat treatment in the higher extreme of the operable range must not be for an extended period so as to prevent the occurrence of such undesirable secondary reactions. After heat treatment, the article is returned to room temperature, desirably in a controlled manner so the glass is annealed.

Table I sets forth examples of glass compositions, analyzed on the oxide basis in weight percent, which are included in my invention. Examples 1–11 are glasses which are but poorly phototropic after heat treatment but which exhibit excellent phototropicity when heat treated after exposure to X-rays or gamma rays. Examples 12–16 are glasses which display satisfactory phototropic properties after the conventional heat treating cycle but which are given a more homogeneous phototropic character when exposed to X-rays or gamma rays prior to heat treatment. The batch ingredients may consist of any materials, either oxides or other compounds, which, on being melted together, will be converted to the desired oxide compositions in the desired proportions. Each example contains silver and at least one of the two halogens, chlorine and bromine, such that the radiation-sensitive crystallization consists of a silver halide. However, it must be appreciated that these examples are illustrative only and other potentially phototropic glasses, particularly those includible within the compositional ranges of the Armistead-Stookey application, described in detail above, are applicable to this invention.

In accordance with conventional analytical practice, the halogen content of these glasses is expressed as percent by weight in excess of the total glass composition in which the sum of all the constituents other than the halogens approximates 100%. (Fluorine is added to the batch to aid in melting but its effect on the phototropicity of the glass has not been fully resolved.) Finally, although it has been determined that a substantial portion, if not all, of the silver is present in the glass body as ions thereof, presumably having bonds with oxygen and/or the halogens, and not as metallic silver, it is denoted in Table I as silver in accordance with conventional analytical practice.

The examples listed in Table I can be produced by melting batches in the usual manner but allowance must be made for volatilization of silver and the halogens. It has been learned that volatilization losses of the halogens during melting may range as as high as 50%, while losses of silver are likely to be as high as 30%. These losses, of course, are dependent upon the temperature of melting and the composition of the batch ingredient utilized.

To study the effects of X-ray and gamma ray exposure on the glasses, after the batches had been compounded, ball-milled, and melted, the melts were conducted to rollers and rolled into sheet glass of about ¼" thickness, this sheet glass being cooled to room temperature in accordance with a conventional annealing schedule. For testing purposes, rectangular plates about 2 x 2 inches were cut from this sheeting.

TABLE I

|  | 1 | 2 | 3 | 4 | 5 | 6 | 7 | 8 |
|---|---|---|---|---|---|---|---|---|
| $SiO_2$ | 59.83 | 59.35 | 58.8 | 59.0 | 59.0 | 59.68 | 60.4 | 59.68 |
| $Al_2O_3$ | 9.9 | 9.7 | 9.0 | 9.1 | 9.1 | 9.4 | 9.4 | 9.2 |
| $B_2O_3$ | 19.24 | 19.62 | 18.5 | 18.2 | 18.2 | 18.26 | 18.26 | 18.26 |
| $Na_2O$ | 10.73 | 10.66 | 10.3 | 10.25 | 10.25 | 10.56 | 10.56 | 10.56 |
| $Li_2O$ |  |  |  |  |  |  |  |  |
| $K_2O$ | 0.03 | 0.03 | 1.09 | 1.12 | 1.12 | 1.14 | 1.14 | 1.14 |
| Br |  | 0.01 | 0.17 | 0.17 | 0.17 | 0.05 | 0.01 | 0.05 |
| Cl | 0.28 | 0.12 | 0.19 | 0.19 | 0.18 | 0.42 | 0.49 | 0.44 |
| F | 0.72 | 0.96 | 0.94 | 0.95 | 0.95 | 0.96 | 0.96 | 0.96 |
| Ag | 0.25 | 0.62 | 0.07 | 0.07 | 0.07 | 0.13 | 0.14 | 0.13 |
| CuO | 0.016 | 0.106 | 0.018 | 0.018 | 0.018 | 0.017 | 0.017 | 0.017 |
| $Fe_2O_3$ | 0.008 | 0.009 | 0.013 | 0.013 | 0.013 | 0.012 | 0.012 | .012 |
| $As_2O_3$ |  |  | 0.13 | 0.13 | 0.13 |  |  |  |
| PbO |  |  | 1.99 | 2.06 | 2.06 | 0.1 |  | 1.0 |
| CdO |  |  |  |  |  | 0.7 | 0.1 |  |
| $Sb_2O_3$ |  |  |  |  |  |  |  |  |

TABLE I—Continued

| | 9 | 10 | 11 | 12 | 13 | 14 | 15 | 16 |
|---|---|---|---|---|---|---|---|---|
| $SiO_2$ | 58.97 | 59.03 | 66.46 | 60.13 | 59.93 | 59.7 | 56.1 | 58.8 |
| $Al_2O_3$ | 9.1 | 9.3 | 6.9 | 9.5 | 9.4 | 9.4 | 9.2 | 9.2 |
| $B_2O_3$ | 19.18 | 18.93 | 20.19 | 19.3 | 19.33 | 19.98 | 18.6 | 18.05 |
| $Na_2O$ | 10.53 | 10.42 | 1.81 | 10.66 | 10.01 | 9.63 | 11.48 | 10.52 |
| $Li_2O$ | | | 2.48 | | | | | |
| $K_2O$ | 1.11 | 1.12 | 0.07 | 0.03 | 0.97 | 0.89 | 0.98 | 1.1 |
| Br | 0.16 | 0.15 | 0.06 | | 0.11 | 0.10 | 0.26 | 0.24 |
| Cl | 0.26 | 0.32 | 0.20 | 0.3 | 0.17 | 0.21 | 0.21 | 0.19 |
| F | 0.82 | 0.81 | 0.11 | 0.77 | 0.85 | 0.90 | 1.14 | 0.88 |
| Ag | 0.08 | 0.11 | 0.18 | 0.38 | 0.32 | 0.36 | 0.15 | 0.11 |
| CuO | 0.017 | 0.03 | 0.017 | 0.015 | 0.033 | 0.032 | 0.018 | 0.019 |
| $Fe_2O_3$ | 0.012 | 0.012 | | 0.009 | 0.009 | 0.011 | 0.013 | 0.013 |
| As | | | | | | | 0.14 | 0.11 |
| PbO | 1.0 | 1.05 | 4.14 | | | | 2.37 | 2.08 |
| CdO | | | | | | | | |
| $Sb_2O_3$ | | | 0.45 | | | | | |

The X-ray exposures were performed with a Westinghouse 250 kv. Industrial X-ray Unit, using a 0.22 mm. copper filter. This filter limited the output from short wave lengths through 0.5 A. This range includes the KB and Ka peaks from a tungsten target. Color appeared in most of the glasses as a faint yellow at 750 roentgens, deepening to a medium brown at 15,000 roentgens. Greater exposures than 15,000 roentgens also induced phototropicity in the subsequently heat treated sample but such longer exposures are not economically practical.

The coloring of the glass due to the X-ray exposure does not appear to be related to the phototropic properties that are eventually developed in the heat treating cycle. In all glasses studied, the X-ray induced color disappeared at temperatures lower than those required to yield the phototropic effect.

Table II records heat treating schedules utilized with several of the above examples in Table I after exposure to X-rays. The heating rate chosen in raising the glass body from room temperature to the temperature of heat treatment apparently has no critical effect upon the resulting phototropicity. The linear coefficients of thermal expansion of these glasses are comparatively low so they may be plunged directly into a furnace maintained at the desired temperature and, likewise, removed directly therefrom to cool to room temperature. However, this practice is generally employed only in the lower extreme of the heat treating range, say up to about 700° C., in order to insure freedom from thermal shock. Similarly, the cooling rate does not usually appear to have a critical effect upon the phototropic properties of the glass although, in some instances, quick cooling acts to enrich phototropicity. In many cases, the very slow cooling resulting by merely cutting off the heat to the heat treating furnace, thereby permitting it to cool at its own rate with the glass body therein, has been found very satisfactory. This practice is termed cooling at furnace rate. Table II also records the amount of X-ray exposure, in roentgens, given to several of the examples before heat treatment and the induced phototropic properties resulting therefrom. $T_0$ represents the initial visible transmission of the glass in percent. This initial transmission is identical for the untreated glass and the glass after exposure to X-rays and after heat treatment, but before exposure to actinic radiation. $T_{10}$ represents the transmission of the heat treated glass after an exposure of ten minutes to a 30 watt black light fluorescent lamp. Such a light has been found to yield a wave length distribution resembling in many respects that of sunlight.

TABLE II

| Schedule No. | Ex. No. | X-ray in Roentgens | Heat Treating Schedule | $T_0$ | $T_{10}$ |
|---|---|---|---|---|---|
| 1 | 11 | $10\times10^3$ | Plunged into furnace at 610° C. Held 30 minutes. Removed from furnace. | 93 | 15 |
| 2 | 11 | $10\times10^3$ | Plunged into furnace at 585° C. Held 30 minutes. Removed from furnace. | 93 | 25 |
| 3 | 11 | $10\times10^3$ | Plunged into furnace at 560° C. Held 30 minutes. Removed from furnace. | 93 | 67 |
| 4 | 11 | $10\times10^3$ | Plunged into furnace at 540° C. Held 30 minutes. Removed from furnace. | 93 | 89 |
| 5 | 9 | $1.5\times10^3$ | Plunged into furnace at 610° C. Held 30 minutes. Cooled at furnace rate. | 91 | 30 |
| 6 | 14 | $10\times10^3$ | do | 92 | 38 |
| 7 | 13 | $5\times10^2$ | do | 90 | 83 |
| 8 | 1 | $5.0\times10^2$ | Heated at 4° C./minute to 550° C. Held 30 minutes. Removed from furnace. | 94 | 90 |
| 9 | 1 | $2.5\times10^3$ | do | 94 | 87 |
| 10 | 1 | $5\times10^3$ | do | 94 | 85 |
| 11 | 1 | $7.5\times10^3$ | do | 94 | 72 |
| 12 | 1 | $10\times10^3$ | do | 94 | 70 |
| 13 | 1 | $12.5\times10^3$ | do | 94 | 65 |
| 14 | 1 | $15\times10^3$ | do | 94 | 56 |

Table II dramatically illustrates the effects of X-ray exposure upon the development of phototropic properties. Each of these examples exhibits but poor phototropicity upon heat treatment only but with a prior exposure to X-rays this phototropicity is greatly enhanced. Table II further demonstrates the need for a substantial heat treatment to develop phototropicity even where X-ray exposure is utilized. This is particularly evident in the first four test results given in Table II where the heat treating temperature was varied from 610° C. to 540° C. The relatively short dwell time (30 minutes) was not sufficiently long to produce satisfactory phototropicity at the lower temperatures. Likewise, the cumulative effect of longer exposure to X-rays is displayed in Schedules 8 to 11 of Table II. It is evident that an exposure of as little as 500 roentgens will induce phototropicity while greater than 15,000 roentgens would undoubtedly improve the phototropic properties further. However, it has been found more efficient and economical to maximize the X-ray exposure at 15,000 roentgens and raise the temperature or extend the time of heat treatment.

The gamma ray exposures covered a range of from $3.2\times10^2$ to $7.6\times10^7$ roentgens. Exposures from $3.2\times10^2$ to $8.6\times10^4$ roentgens were made with a cobalt 60 source, while exposures from $5.1\times10^5$ to $7.6\times10^7$ roentgens were made using reactor fuel elements. As in the case of X-ray exposures, color became apparent in the glasses upon long exposures, this coloring varying from a slight yellow at $7.2\times10^3$ roentgens to dark brown at $7.6\times10^7$ roentgens.

However, as again in the case of X-ray exposure, the coloring of the glass due to the ionizing ray exposure does not appear to be related to the phototropic properties eventually produced by a heat treatment. In all the glasses examined, the gamma ray-induced color faded away at a temperature lower than that required for heat treatment.

Table III sets forth heat treating schedules utilized after exposing several of the examples in Table I to gamma rays. Also recorded is the amount of gamma ray exposure, in roentgens, given to those examples and the induced phototropic properties resulting from this combination of gamma ray exposure and heat treatment. $T_0$ again represents the initial visible transmission and $T_{10}$ the transmission of the treated glass after exposure to a 30 watt black light fluorescent lamp for 10 minutes.

TABLE III

| Schedule No. | Ex. No. | Gamma Rays in Roentgens | Heat Treating Schedule | $T^0$ | $T^{10}$ |
|---|---|---|---|---|---|
| 1 | 11 | $5.0 \times 10^2$ | Plunged into furnace at 635° C. Held 30 minutes. Removed from furnace. | 87 | 83 |
| 2 | 11 | $2.0 \times 10^3$ | ___do___ | 87 | 68 |
| 3 | 11 | $4.2 \times 10^3$ | ___do___ | 87 | 63 |
| 4 | 11 | $10.7 \times 10^4$ | ___do___ | 87 | 21 |
| 5 | 11 | $8.6 \times 10^5$ | ___do___ | 87 | 19 |
| 6 | 11 | $5.1 \times 10^6$ | ___do___ | 87 | 15 |
| 7 | 11 | $7.6 \times 10^7$ | ___do___ | 87 | 16 |
| 8 | 11 | $8.6 \times 10^5$ | Plunged into furnace at 610° C. Held 30 minutes. Removed from furnace. | 87 | 47 |
| 9 | 11 | $8.6 \times 10^5$ | Plunged into furnace at 585° C. Held 30 minutes. Removed from furnace. | 87 | 69 |
| 10 | 11 | $8.6 \times 10^5$ | Plunged into furnace at 560° C. Held 30 minutes. Removed from furnace. | 87 | 79 |
| 11 | 11 | $8.6 \times 10^5$ | Plunged into furnace at 540° C. Held 30 minutes. Removed from furnace. | 87 | 83 |
| 12 | 2 | $8.6 \times 10^5$ | Plunged into furnace at 635° C. Held 30 minutes. Removed from furnace. | 90 | 40 |
| 13 | 4 | $8.6 \times 10^5$ | ___do___ | 90 | 18 |
| 14 | 1 | $8.6 \times 10^5$ | ___do___ | 92 | 51 |
| 15 | 12 | $8.6 \times 10^5$ | ___do___ | 92 | 54 |
| 16 | 15 | $8.6 \times 10^5$ | ___do___ | 90 | 15 |
| 17 | 16 | $8.6 \times 10^5$ | ___do___ | 93 | 57 |

Each of the above examples exhibits poor phototropic properties when subject to heat treatment only but, as is unquestionably demonstrated in Table III, a prior exposure to gamma rays greatly enhances this characteristic. The effect of gamma ray irradiation appears to be cumulative, but apparently levels off in the range of $8.6 \times 10^5$ roentgens. Longer exposures than this have little more practical effect and exposures longer than $7.6 \times 10^7$ roentgens are considered uneconomical. Test runs 8–11 in Table III clearly indicate the fact that a thorough heat treatment is required to develop good phototropicity when gamma rays are utilized. Test runs 1 and 2 indicate that an exposure of as little as about 500 roentgens will cause some phototropicity but at least about 2000 roentgens is desirable to produce a substantial effect upon the phototropic properties of the glass body.

The preferred embodiment of my invention consists of the exposure of a glass body having the composition of Example 11 of Table I to gamma ray radiation of $8.6 \times 10^5$ roentgens, followed by a heat treating schedule comprising plunging the glass body into a furnace maintained at 635° C., maintaining thereat for 30 minutes, and then removing the body from the furnace to cool to room temperature.

This invention has the ancillary contribution of providing a method of producing phototropic images in certain areas only of a glass body. Thus, glasses which exhibit but poor phototropicity when subjected to heat treatment alone can be exposed in specific areas to X-rays or gamma rays such that a subsequent heat treatment will render these exposed areas very satisfactorily phototropic. The intensity of the phototropic image is dependent upon composition, ionizing exposure, and the heat treating cycle. This ability to produce phototropic images in exposed areas only makes possible such applications as gradient exposures for automobile windshields, special signs, louvers and grids for window and lighting uses, and special half tone effects.

What is claimed is:

1. A method of making a phototropic glass body comprising the steps of melting a glass-forming batch containing at least one halogen in the indicated minimum effective proportion of 0.2% chlorine, 0.1% bromine, and 0.08% iodine and a minimum of silver in the indicated proportion of 0.2% in a glass wherein the effective halogen consists of chlorine, 0.05% in a glass containing at least 0.1% bromine but less than 0.08% iodine, and 0.03% in a glass containing at least 0.08% iodine, simultaneously cooling the melt below the transformation point thereof and shaping a glass body therefrom, thereafter irradiating at least a portion of said glass body with X-rays and subjecting said body to a temperature of at least 400° C., but not over about 1000° C., for a time sufficient to precipitate submicroscopic crystals of radiation-sensitive material, and finally cooling said body to room temperature.

2. A method of making a phototropic glass body comprising the steps of melting a batch for a glass composition which, by analysis, consists essentially, by weight, of 40–76% $SiO_2$, 4–26% $Al_2O_3$, 4–26% $B_2O_3$, at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$, at least one halogen in the indicated minimum effective proportion of 0.2% chlorine, 0.1% bromine, and 0.08% iodine, and a minimum of silver in the indicated proportion of 0.2% in a glass wherein the effective halogen consists of chlorine, 0.05% in a glass containing at least 0.1% bromine but less than 0.08% iodine, and 0.03% in a glass containing at least 0.08% iodine, the total of the recited constituents being at least 85% of the total glass composition, simultaneously cooling the melt below the transformation point thereof and shaping a glass body therefrom, thereafter irradiating at least a portion of said glass body with X-rays and subjecting said body to a temperature of at least 400° C., but not over about 1000° C., for a time sufficient to precipitate submicroscopic crystals of radiation-sensitive material, and finally cooling said body to room temperature.

3. A method according to claim 2 wherein the irradiation to X-rays comprises at least about 500 roentgens.

4. A method according to claim 2 wherein the time sufficient to precipitate submicroscopic crystals of radiation-sensitive material varies from about 1 minute at 1000° C. to about 24 hours at 400° C.

5. A method of making a phototropic glass body comprising the steps of melting a glass-forming batch containing at least one halogen in the indicated minimum effective proportion of 0.2% chlorine, 0.1% bromine, and 0.08% iodine and a minimum of silver in the indicated proportion of 0.2% in a glass wherein the effective halogen consists of chlorine, 0.05% in a glass containing at least 0.1% bromine but less than 0.08% iodine, and 0.03% in a glass containing at least 0.08% iodine, simultaneously cooling the melt below the transformation point thereof and shaping a glass body therefrom, thereafter irradiating at least a portion of said glass body with gamma rays and subjecting said body to a temperature of at least 400° C., but not over about 1000° C., for a time sufficient to precipitate submicroscopic crystals of radiation-sensitive material, and finally cooling said body to room temperature.

6. A method of making a phototropic glass body comprising the steps of melting a batch for a glass composition which, by analysis, consists essentially, by weight, of 40–76% $SiO_2$, 4–26% $Al_2O_3$, 4–26% $B_2O_3$, at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$, at least one halogen in the indicated minimum effective proportion of 0.2% chlorine, 0.1% bromine, and 0.08% iodine, and a minimum of silver in the indicated proportion of 0.2% in a glass wherein the effective halogen consists of chlorine, 0.05% in a glass containing at least 0.1% bromine but less than 0.08% iodine, and 0.03% in a glass containing at least 0.08% iodine, the total of the recited constituents being at least 85% of the total glass composition, simultaneously cooling the melt below the transformation point thereof and shaping a glass body therefrom, thereafter irradiating at least a portion of said glass body with gamma rays and subjecting said body to a temperature of at least 400° C., but not over about 1000° C., for a time sufficient to precipitate submicroscopic crystals of radiation-sensitive material, and finally cooling said body to room temperature.

7. A method according to claim 6 wherein the irradiation to gamma rays comprises at least about 500 roentgens.

8. A method according to claim 6 wherein the time sufficient to precipitate submicroscopic crystals of radiation-sensitive material varies from about 1 minute to 1000° C. to about 24 hours at 400° C.

References Cited by the Examiner

UNITED STATES PATENTS

| | | | |
|---|---|---|---|
| 2,682,134 | 6/1954 | Stookey | 204—157.1 |
| 3,208,860 | 9/1965 | Armistead et al. | 106—54 |

JOHN H. MACK, *Primary Examiner.*

H. S. WILLIAMS, *Assistant Examiner.*